United States Patent
Pinnix

(10) Patent No.: US 8,959,484 B2
(45) Date of Patent: Feb. 17, 2015

(54) SYSTEM FOR HOSTED, SHARED, SOURCE CONTROL BUILD

(75) Inventor: Justin Everett Pinnix, Raleigh, NC (US)

(73) Assignee: Microsoft Corporation, Redmond, WA (US)

( * ) Notice: Subject to any disclaimer, the term of this patent is extended or adjusted under 35 U.S.C. 154(b) by 322 days.

(21) Appl. No.: 13/529,856

(22) Filed: Jun. 21, 2012

(65) Prior Publication Data

US 2013/0346946 A1 Dec. 26, 2013

(51) Int. Cl.
*G06F 9/44* (2006.01)

(52) U.S. Cl.
USPC .......................................................... 717/124

(58) Field of Classification Search
CPC .......................................................... G06F 9/44
USPC .......................................................... 717/124
See application file for complete search history.

(56) References Cited

U.S. PATENT DOCUMENTS

| | | | | |
|---|---|---|---|---|
| 7,596,778 | B2 * | 9/2009 | Kolawa et al. | 717/126 |
| 2005/0044531 | A1 * | 2/2005 | Chawla et al. | 717/122 |
| 2009/0037890 | A1 * | 2/2009 | Kazmi | 717/142 |
| 2009/0055810 | A1 * | 2/2009 | Kondur | 717/140 |
| 2009/0070750 | A9 * | 3/2009 | Gu | 717/140 |
| 2009/0300580 | A1 * | 12/2009 | Heyhoe et al. | 717/106 |
| 2010/0191690 | A1 * | 7/2010 | Bitonti et al. | 706/47 |
| 2011/0161929 | A1 * | 6/2011 | Keating | 717/120 |
| 2011/0197175 | A1 * | 8/2011 | Bouz et al. | 717/107 |
| 2013/0346946 | A1 * | 12/2013 | Pinnix | 717/124 |

OTHER PUBLICATIONS

ElectricCommander, Applicant Provided Prior Art (Published Jul. 10, 2011).*
"ElectricCommander—Automate and Accelerate Application Development Processes", Published on: Jul. 10, 2011, Available at: http://www.electric-cloud.com/products/electriccommander.php.

* cited by examiner

*Primary Examiner* — Don Wong
*Assistant Examiner* — Theodore Herbert
(74) *Attorney, Agent, or Firm* — Kevin Sullivan; Brian Haslam; Micky Minhas

(57) ABSTRACT

Compiling source code to provide an executable code build. The method includes configuring a pool of substantially identical virtual machines in a distributed cloud computing environment. Configuring may include configuring virtual machines to have generic code compiling functionality. The method further includes determining that source code for a particular user should be compiled. As a result, the method includes selecting a virtual machine from the pool of substantially identical virtual machines and configuring the selected virtual machine in a way that is specific to the user. Source code for the user is retrieved from a source control system deployed in the distributed computing environment. Using the virtual machine configured in the way specific to the user, the user's retrieved source code is compiled to compiled code. After compiling is completed, the configured virtual machine is restored to a generic form.

20 Claims, 2 Drawing Sheets

SYSTEM FOR HOSTED, SHARED, SOURCE CONTROL BUILD

BACKGROUND

Background and Relevant Art

Computers and computing systems have affected nearly every aspect of modern living. Computers are generally involved in work, recreation, healthcare, transportation, entertainment, household management, etc.

Computer systems are generally controlled by software that directs the hardware as to functions that should be performed by the computer systems. Often, software used to control computer hardware is in the form of low level machine executable code. In particular, low level machine executable code typically includes operation codes (OP codes) for a machine language instruction set that direct computer processors and hardware to perform basic low level tasks that when performed in concert are able to accomplish complex computing tasks.

Low level machine code is typically quite difficult for a programmer to understand and generate as the low level machine code may be expressed in binary OP codes. Thus, programmers typically program using higher level programming languages. Using these higher level programming languages, source code is generated. The source code is often quite readable and often includes additional comments by the programmer explaining the purpose of various lines of code. A particular line of source code may represent a large number of low level machine executable instructions. A compiler is typically used to compile the source code to low level machine executable instructions.

Compiling source code to low level machine executable code can be a hardware intensive task for large software applications. Additionally, when developing a software application, the programmer may have multiple versions of the application and multiple iterations of source code implementing various functional pieces. It may be useful to store these various versions in a centralized repository that can be accessed by the programmer. However, to compile one or more of the various versions of source code, the programmer may need to retrieve the source code from the centralized location. This retrieval act alone can be quite a substantial use of network resources as the source code may be quite large in terms of data storage and network bandwidth resources needed to transmit it. Compiling may utilize excessive amounts of processing power at the programmer's computer system to compile the source code low level machine executable code.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein is directed to a method practiced in a distributed computing environment. The method includes acts for compiling source code to provide an executable code build. The method includes configuring a pool of substantially identical virtual machines in a distributed cloud computing environment. Configuring may include configuring virtual machines to have generic code compiling functionality. The method further includes determining that source code for a particular user should be compiled. As a result, the method includes selecting a virtual machine from the pool of substantially identical virtual machines and configuring the selected virtual machine in a way that is specific to the user. Source code for the user is retrieved from a source control system deployed in the distributed computing environment. Using the virtual machine configured in the way specific to the user, the user's retrieved source code is compiled to compiled code. After compiling is completed, the configured virtual machine is restored to a generic form.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein allow customers to easily perform automated builds of their source code using shared resources in a public cloud, such as Windows Azure™ available from Microsoft® Corporation of Redmond Wash. or Amazon EC2 available from Amazon.com Inc. of Seattle Wash. Embodiments may implement a service that allows a large number of customers to share a pool of worker build machines in a public cloud to produce builds of customer's code. This may be offered as part of a web service that runs in the public cloud, on top of existing cloud computing infrastructure. In some embodiments, this may be performed by the Team Foundation Service available from Microsoft® Corporation of Redmond Wash.

Embodiments may be implemented where customers who desire to have source code compiled into a low level machine code build do not have to set up any physical or virtual machines for the build. Rather, the service determines how many machines are needed for the build and automatically configures the machines for performing the build.

Embodiments may be implemented where customers share machines. However, the machines may implement isolation, such that customers and their data are isolated from each other, even though the same machine may be preparing builds for the different customers sharing the same machine.

Embodiments may be implemented where by default, customers run from a common image used to create a virtual machine for performing builds. Custom images for virtual machines for performing builds may alternatively or additionally be used.

Embodiments may be implemented where each customer can customize their build process with their own workflow and activities, even though the build machines are hosted by shared resources in a public cloud.

Figure 1:
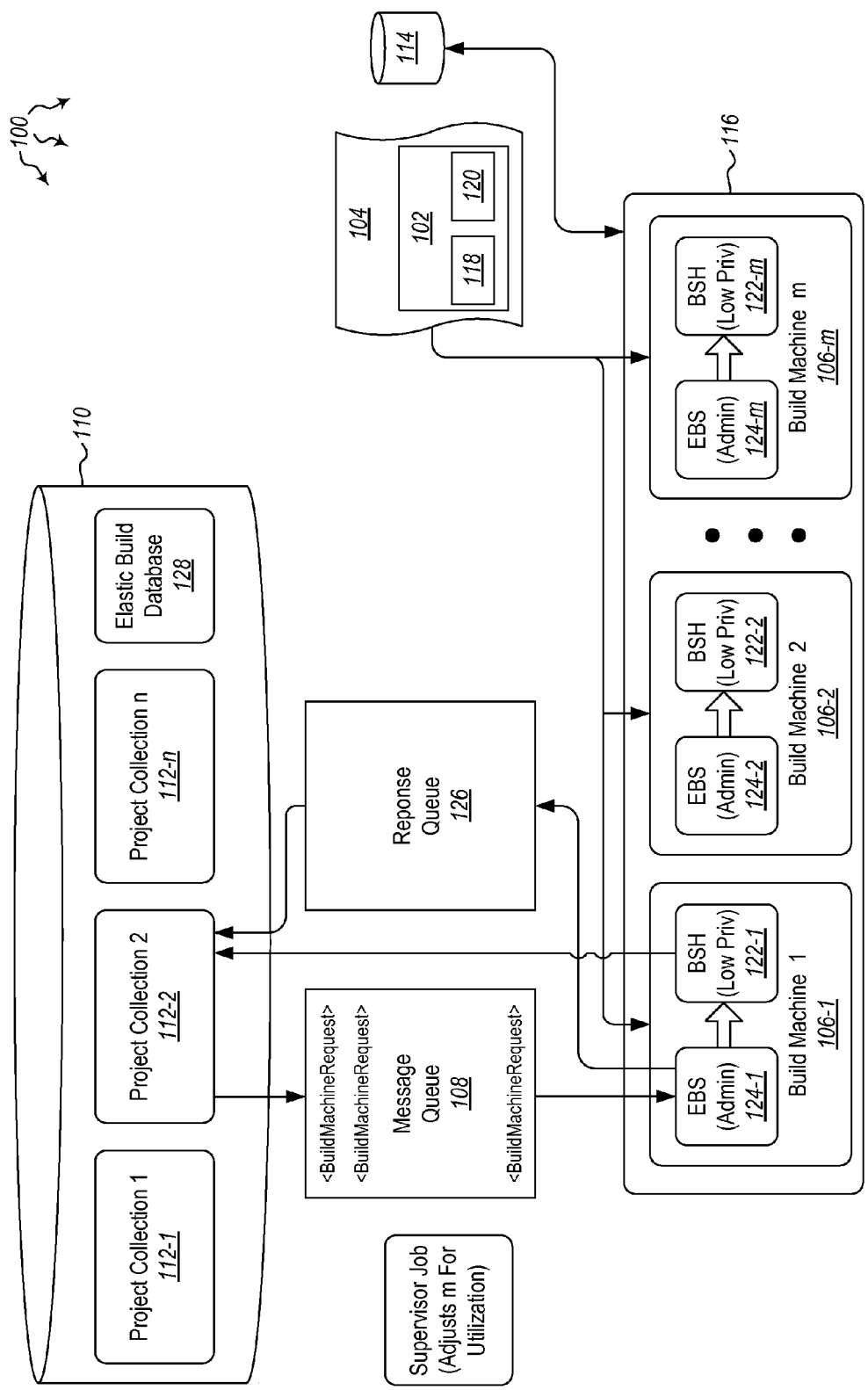
FIG. 1 illustrates a cloud based public service configured to compile source code for users.

Referring now to FIG. 1, various details are illustrated. A service 100 includes build tools 102 that are pre-installed into a common build machine image 104. The build tools include a controller 118 and an agent 120. This image 104 is replicated across a number of worker build machines 106-1 through 106-m (referred to generally as 106). These machines 106 are used by all customers.

Each worker build machine 106 is configured with a controller 118 and an agent 120. The controller 118 acts as a single point of control for a build. It executes the main build workflow and coordinates agent activities. Build agents 120 do the "heavy lifting" of running a build, such as fetching files from version control and compilation. Each controller 118 has one or more agents 120.

Each customer has an account in the service 100. A customer's account may have billing and/or subscription information defining what access to public cloud resources a user has or allowing a user to be billed for use of public cloud resources. Alternatively or additionally, the account may be associated with storage 110 at the service 100. The storage 110 can store data for the customers. For example, the storage 110 may include project collections 112-1 through 112-n (referred to generally as 112) with different source code collections for the same or different customers. Alternatively or additionally, a customer may be able to store custom configuration files or build preference information as part of their account information. In particular, a customer can specify and define a build process.

When a customer requests a build be performed to compile source code to low level machine executable code, the request is placed into a centralized queue 108. The worker build machines 106 monitor the queue 108 and the first available worker build machine 106 will be assigned the task for the requested build. Upon receipt, the assigned worker build machine 106 will be configured to attach to the requesting customer's account and perform the build. The controller 118, once configured for a specific customer, is scoped to a single project collection 112. In particular, the next available worker build machine gets the request, configures its controller 118 and agent 120 to point to the requestor's project collection 112 and starts the controller 118 and agent 120. Further, the worker build machine 106 may be additionally configured to perform a build as defined by a customer's build process associated with the customer's account.

Intermediate files are written to the worker build machine 106 and the results of the build are copied to a drop share 114 during and at the conclusion of the build process. The drop share 114 is a share on a file server that may be accessed, for example, using an ordinary universal naming convention (UNC) path. Embodiments may store the drop share 114 on the public cloud.

At the conclusion of the build, the customer data is expunged from the worker build machine 106 and the worker build machine 106 is returned to the pool 116 of available worker build machines to service the next customer's request. This may include shutting down the controller 118 and agent 120 on the worker build machine 106. This may further include un-configuring the controller 118 and agent 120, such as by disassociating them from the project collection 112. This may further include cleaning up the worker build machine 106, and returning it to the pool 116.

As the build process is user-defined, embodiments are able to provide a level of isolation between the build process and the core operation of the worker build machine 106. The customers' build runs as a limited privilege user, which allows embodiments to effectively expunge their data and lingering processes. This can be used to enforce isolation between customers; which may be an important business requirement.

The following illustrates one example of worker build machine components and configuration. In some embodiments, each worker build machine 106 is an instance of a cloud service 100 virtual machine (VM) role. A master image 104 has build pre-requisites installed. In one example embodiment, this may include: TFS Team Build; Visual Studio Dev11 Ultimate; Visual Studio 2010 Ultimate; and Azure SDK 1.5 all available from Microsoft Corporation of Redmond Wash. Of course different components may be used depending on functional need. Further, in some embodiments, the cloud service 100 administrators control the list of components, and not the customer.

The master image 104 may be automatically built using a script, such as a Windows Powershell™ script. Once setup is complete, the image 104 is sysprepped and uploaded to the public cloud service 100. The public cloud service 100 "clones" this image 104 to set up a number of worker build machines 106 to create or augment the pool 116. The build tools that are installed on the machines include a build service host (BSH) (referred to generically as 122, but shown with specificity in FIG. 1 as 122-1, through 122-m), which are installed but not configured. This service host 122 runs in a lower privilege state. In addition to the build service host 122, embodiments install an extra service called the Elastic Build Service (EBS) (referred to herein generally as 124, but shown with specificity as 124-1 through 124-m). This is a service that runs as the administrator.

The following illustrates a basic algorithm that may be performed to configure a worker build machine 106:
1. Create a low-privileged service account.
2. Create an agent directory and grant write access to the service account.
3. Connect to the cloud service storage service (e.g. storage service 100).
4. Read next available message from the work queue (e.g. work queue 108).
   For each message:
   a. Extract information from the message that provides the location of the user's collection (e.g. project collection 112) and authentication information used to connect to it. Some embodiments may perform this using tokens and URLs, however, other embodiments may use other authentication systems such as ODATA, Kerberos, etc.
   b. Configure the build service host (e.g. build service host 122) to point to this project collection 112 and run as the low-privileged service account.
   c. Start the build service host.
   d. Acknowledge the message from the work queue which prevents it from being redelivered to a different worker build machine.
   e. Monitor the controller's progress—wait for either a timeout or a completed build.

f. Shut down the build service host.
g. Terminate all processes belonging to the low-privileged service account.
h. Delete the low-privileged service account's user profile and directory.
i. Delete the contents of the agent directory.
j. If any cleanup errors occur, shut down the service and alert an operation management module that the machine is in an unclean state.
k. Send build timing information to a central store.

The following now illustrates additional details that may be implemented as components of the system 100 that are shared by all worker build machines. Specifically, embodiments may include a storage account which is a cloud service storage account that is used to keep track of the hosted build work. This storage account may be secured using a secondary access key, which may be stored as part of the service configuration. Embodiments may distribute this information to each role instance.

Some embodiments may include a request queue (such as the message queue 108) that is part of the storage account. The request queue stores worker build machine requests. A pool (such as pool 116) of worker build machines can read this queue. Embodiments may be configured to ensure that each message is delivered to only one machine and that they are handled in roughly FIFO order. Further, embodiments may include a response queue, such as the response queue 126. Once a build request is completed, the worker build machine will queue a message into this response queue indicating the build start and stop time and other relevant information.

Embodiments may include a database. The database may be used to keep track of various pieces of information. Embodiments may include a deployment-wide database to hold this information. The database 128 is globally scoped, rather than being scoped to the users' project collection. This database is used to track the results of hosted builds for all users, to track in-progress results (instead of or in addition to the queue), and to keep statistical information about the machines and queues.

Security is an important concern. The worker build machines 106 may be accessing a customers' sensitive data—their source code. It may be important that customer A not be able to access customer B's source code. Embodiments may also include functionality to prevent customers leaving anything behind that would tamper with other customers' builds.

Embodiments may include functionality to protect the integrity of the system 100 itself. In some such embodiments, the worker build machine 106 will not have credentials that would allow it to access or modify the deployment configuration database. To this end, database connection strings or credentials are not given to the worker build machines 106. The worker build machines will communicate using the request queue, response queue, or public web services. Some embodiments may allow worker build machines 106 to have a richer interaction with an elastic build database 128, by use of an internal web service that they can call.

Automated build systems are elevation mechanisms. Code is executed in a service account (that usually has some special privileges) that can be checked into the source tree by ordinary users (in most cases). So, care is taken to contain damage to the user's project collection 112. To this end, the build is executed as a low privileged account. This account is a local machine account and has no domain access. Instead, it is explicitly granted write access to a single directory where the build will take place.

The local service account is created by the elastic build service 124 at startup time. Its username and password are controlled by the public cloud service configuration and can be changed by the operations team of the public cloud service 100. Embodiments may generate the password randomly to further prevent its disclosure.

The local service account may have a profile. This profile includes per-user settings, temporary directories, a documents folder, and other things that are expected to exist for a user. After each customer's build runs, the elastic build service 124 will perform a machine cleanup. The machine cleanup will terminate the user's processes, empty the agent directory, and fully delete the user's profile. This cleanup operation may also be performed when the elastic build service 124 initially starts. If the cleanup process is unable to complete, the service may be shut down and the worker build machine 106 does not process any requests. This is to prevent a compromised worker build machine 106 from executing builds.

The elastic build service 124 runs as a local administrator so as to have permissions for cleaning up the local service account. The elastic build service 124 runs as a different user than the build service host 122. This is to prevent the user's build from having access to shared resources, such as the work queue 108.

The public cloud service's services may be protected using keys. These keys may be simple strings that behave like passwords. The storage service which houses the queues may not provide for granular access. In such cases, if a user has the key, they can read, write and delete messages, and even create and delete queues. Also, the same user would be able to modify any tables or blobs housed in the same storage account. As a result, the hosted build storage account is implemented separate from the storage account used to store build data. Otherwise, if a user were to gain admin access to the worker build machine 106, they would be able to access the BLOB store, which contains all of the version control files.

To execute a build against a project collection 112, the worker build machine 106 has credentials that are recognized by the project collection 112. However, those credentials will not be recognized by another other project collection 112 (as doing so would give customers access to each others' data). Therefore, embodiments may be implemented such that each project collection 112 will have its own credentials to be used for the build service account. When the project collection 112 queues a worker build machine request, it will include a token that can be used to authenticate back to the project collection 112 as the service account. The elastic build service 124 will pass this token along to the build service host 122 which will connect using the token. The token may be included in the worker build machine request message as plain text, thus, embodiments may be configured to ensure that unauthorized users do not have access to the work queue.

Using tokens helps limit the damage if the token is compromised. If customer A were to obtain customer B's token, it will only be usable for a limited period of time, such as for about 8 hours.

Embodiments may control access to the elastic build system 124 itself by controlling which project collections 112 get virtual controllers. Embodiments may be configured such that without a virtual controller, it is not possible to queue requests to the elastic build service 124.

Within a single project collection 112, customers will be able to choose who can and cannot access builds.

Each project collection 112 has a single virtual controller 118. Each virtual controller will be able to run a single build at a time. This helps mitigate the possibility of project collection 112 users staging a denial of service (DOS) attack. Embodiments may also place an overall timeout on the build to prevent a "piggy" or malicious customer from tying up a machine for an extended period of time. This limit may be settable by the operations team, but may also have a default value, such as, for example, about 1 hour.

Additional capacity may be achieved by allowing more than one customer's build to run on a given worker build machine 106 at substantially the same time. Such use may be referred to as multi-tenancy.

Some example embodiments may be implemented using two-core virtual machines (VMs) with about 35 GB of disk space and about 2 GB of RAM. A small number of simultaneous builds can be supported by effectively replicating the elastic build service 124 and build service host 122 services on a single worker build machine 106. Each build service host 122 has a unique low-privileged service account to prevent customers from accessing each others' data. Each build service host 122 will have its own agent directory and embodiments include isolation functionality to prevent other agents from having read access to it.

Elastic build service 124 and build service host 122 need only be installed once on a given worker build machine 106. Multiple instances can share the same executable files. Embodiments may configure multiple instances of the build service host, so that each can run in process isolation from the others as a separate user. Only a single instance of the elastic build service 124 may be run as it can run multiple threads to service multiple requests.

In some embodiments, additional isolation may be provided by using a virtualization technology such as Drawbridge—a technology developed by Microsoft® Research of Redmond Wash. Each user's build will run in a Drawbridge picoprocess, giving it further isolation from the worker build machine, thus improving security.

Drawbridge is a research prototype of a new form of virtualization for application sandboxing. Drawbridge combines two core technologies: First, a picoprocess, which is a process-based isolation container with a minimal kernel API surface. Second, a library OS, which is a version of Windows enlightened to run efficiently within a picoprocess.

Drawbridge combines the picoprocess and the library OS, to provide a new form of computing, which retains the benefits of secure isolation, persistent compatibility, and execution continuity, but with drastically lower resource overheads.

The Drawbridge picoprocess is a lightweight, secure isolation container. It is built from an OS process address space, but with all traditional OS services removed. The application binary interface (ABI) between code running in the picoprocess and the OS follows the design patterns of hardware VMs; it includes a closed set of downcalls with fixed semantics that provide a stateless interface. ABI calls are serviced by the security monitor, which plays a role similar to the hypervisor or VM monitor in traditional hardware VM designs.

While the Drawbridge picoprocess interface follows the design patterns of hardware VM interfaces, it uses a high level of abstraction. The Drawbridge picoprocess interface surfaces threads, private virtual memory, and I/O streams instead of low-level hardware abstractions like CPUs, MMUs, and device registers. These higher-level abstractions allow for much more efficient implementations of OS code hosted within the picoprocess. These higher-level abstractions also allow for much more efficient resource utilization. A library OS is an operating system refactored to run as a set of libraries within the context of an application.

Some embodiments may implement fault tolerance functionality. A public cloud service may make very few guarantees about the availability of the hardware on which it runs. A machine may disappear at any time without warning. This may be due to a hardware failure, maintenance, or a pool size change.

In some embodiments, the service 100 may externally monitor builds and actively detect when the worker build machines 106 building them have disappeared. Embodiments may be implemented where service 100 to controller 118 communication happens via a long-polling message queue service. This message queue service includes detection of client disconnects. This gives the service 100 a good indication of whether or not the controller 118 is available. This allows the service 100 to determine when builds have failed and to kill them in the service 100. In some embodiments, if the worker build machine disconnects from the message queue service, a timer is started. If the connection is not re-established during the timeout period, the build is marked as failed.

This solves the detection problem, but does not make the build succeed. To address this, some embodiments will also requeue the failed build. This will cause another worker build machine request to go into the queue 108 and to be picked up by a different worker build machine 106.

Embodiments may also implement failure windows within the elastic process itself. For this, embodiments may use the service's 100 queue service's visibility timeout feature. When the elastic build service 124 reads a message from a queue, it will specify a visibility timeout (which in some embodiments may default to about 5 minutes, but is settable). If the message is not acknowledged by the elastic build service within the visibility timeout, it will be made active again and picked up by another worker build machine 106.

The visibility timeout may not be long enough to execute an entire build. However, it may be sufficient time to get the build service host configured and the build started. As such, embodiments can acknowledge the message once the build service host has been started. Any failures after that point will be covered by the service retry mechanism described above.

Should a worker build machine request get re-queued while the first one is still underway, a locking mechanism in the service 100 can prevent both machines from "owning" the project collection 112 at the same time. The second request will fail to acquire the lock and terminate.

Embodiments may include functionality to determine and set the size of the pool 116. For example, in some embodiments, the pool size will be manually set by the service administrators. Administrators can collect wait time data to determine if wait times are exceeding a predetermined threshold. Administrators can manually modify the service configuration to increase the pool 116 size. The service 100 will handle bringing the new machines online.

Determining that the pool is too big can be measured by looking at idle times of the worker build machines 106. If too many worker build machines 106 are idle, it indicates that the pool needs to be shrunk. That change can be manually performed by the administrators in the same manner.

As described above, some embodiments allow a user to manually adjust the number of worker build machines 106 in the pool 116. However, embodiments may include functionality for automating the pool 116 size. This can be done using a supervisor job that monitors usage. The supervisor job may be a scheduled job that will run periodically. For example, embodiments may run the supervisor job at an interval equal to or greater than the amount of time it takes to bring new worker build machines online. In some examples, this may be a time period about equal to 15 minutes. The supervisor job will analyze the current state of the system. It will consume the usage data produced by the elastic build services. From this usage data, it computes two numbers—an arrival rate and a service rate. The arrival rate is the number of worker build machine requests per unit of time system wide. The service rate is the number of builds completed per unit of time per worker build machine. These numbers may be plugged into a model, such as an M/M/c queue model. Different numbers of machines will be tried until embodiments find the smallest number that produces a predefined wait time for a set of users. For example, embodiments may attempt to produce a wait time of less than one minute for 99% of customers. Some padding can be added to handle machine failures and a new pool size will be computed.

The supervisor job then instructs the public cloud service 100 to change the size of the pool 116. The supervisor job may hold a valid management certificate for the cloud service 100 to be able to accomplish this. This is quite a high level of elevation, so embodiments may separate this supervisor job into its own role or possibly its own deployment. The public cloud service 100 itself may perform some dynamic sizing, so a similar job may be designed for the cloud service 100 that runs in the same elevated environment.

Embodiments may include computer modules that look for peaks and valleys that correspond to a daily pattern of usage. When these patterns are detected, modules can add some prediction capability to the algorithm. Embodiments may choose to perform computations on an hour-by-hour basis. During each preceding hour, embodiments can use estimates of the next hour's demand to set the pool size. This way, embodiments can get machines online ahead of a surge in demand.

Embodiments may include functionality to implement multi-image support. In particular, there may be scenarios where customers may want to be able to use different images 104. For example different images may be desirable for each of the following scenarios: to build against pre-release versions of the operating system; to test out a patch that is not to be rolled out to all customers yet; to deliver a "private fix" to an important customer; to use a build tool that is incompatible with something else on the standard image.

Embodiments may therefore include support for multiple images. Each image has its own machine pool 116 and work queue 108. A list of images may be maintained in a deployment database. Each virtual controller points to a single, named image. Customers can choose which image they are building against by choosing the appropriate virtual controller.

Some embodiment may implement multi-queue support. The virtual controller approach provides a convenient way to rate limit customer's build requests. Each virtual controller is in effect a build queue. A customer has complete visibility and control over the order in which their builds will run. However, they are subject to the limit of one build per customer at a time.

Rate limiting is important for preventing starvation. As many public cloud systems charge customers a flat rate per month, those systems cannot allow them to use a disproportionate amount of build resources. Doing so would either drive up costs or reduce availability of the system to other users. However, larger customers may need more throughput. One way of doing this is to allow them to buy more queues.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
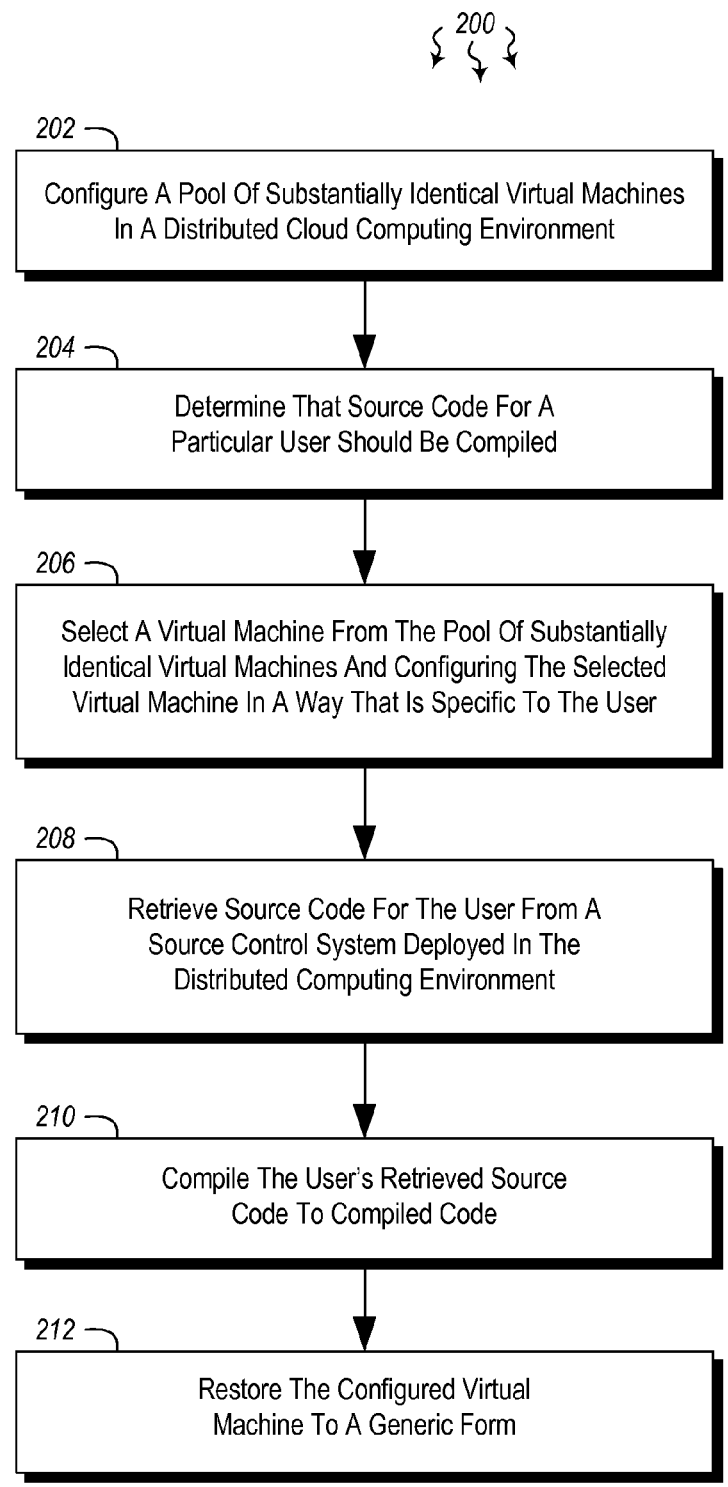
FIG. 2 illustrates a method of compiling source code to provide an executable code build.

Referring now to FIG. 2, a method 200 is illustrated. The method 200 may be practiced in a distributed computing environment and includes acts for compiling source code to provide an executable code build. The method 200 includes configuring a pool of substantially identical virtual machines in a distributed cloud computing environment (act 202). Configuring a pool of substantially identical virtual machines in a distributed cloud computing environment may include configuring virtual machines to have generic code compiling functionality. For example, as illustrated in FIG. 1, machines in the pool 116 at a public cloud service 100 are configured with an image 104 which includes build tools 102.

The method 200 further includes determining that source code for a particular user should be compiled (act 204). For example, a user may log into an account in a distributed cloud computing environment and select source code that the user would like compiled to low level machine readable code.

The method 200 further includes, as a result, selecting a virtual machine from the pool of substantially identical virtual machines and configuring the selected virtual machine in a way that is specific to the user (act 206). For example, the virtual machine may be configured to compile a user's source code by applying user setting and configurations to the virtual machine. The method 200 may be practiced where configuring the selected virtual machine in a way that is specific to the user comprises configuring the machine according to user selected options. In some embodiments, the method 200 may be practiced where configuring the selected virtual machine in a way that is specific to the user comprises using user provided tools as part of the configuration of the virtual machine. User provided tools can be loaded onto the virtual machine and used to compile source code to perform very customized compilations for particular users.

The method 200 further includes retrieving source code for the user from a source control system deployed in the distributed computing environment (act 208). For example, FIG. 1 illustrates that source code may be retrieved from a project collection 112 and delivered to a worker build machine 106.

The method 200 further includes using the virtual machine configured in the way specific to the user, compiling the user's retrieved source code to compiled code (act 210). For example, as illustrated in FIG. 1, a worker build machine 106 may compile source code for a user.

The method 200 further includes, after compiling is completed, restoring the configured virtual machine to a generic form (act 212). For example, in some embodiments, the method 200 may be practiced where restoring the configured virtual machine to a generic form comprises restoring the configured virtual machine back to worker build machine having generic code compiling functionality. For example, as illustrated in FIG. 1, a worker build machine 106 may be returned to a stock machine by wiping the machine and reapplying the image 104 and returning it to the pool 116. Alternatively or additionally, the method 200 may be practiced where restoring the configured virtual machine to a generic form comprises restoring the configured virtual machine back to a generic machine not having special purpose configuring. For example a worker build machine 106 may be wiped and not have the image 104 restored to it.

The method 200 may further include measuring idle times of virtual machines in the pool of substantially identical virtual machines and based on the idle times reducing the number of virtual machines in the pool of substantially identical virtual machines. For example, if idle times of the work build machines 106 are too long, the number of worker build machines in the pool 116 may be reduced so as to not underutilize resources.

The method 200 may further include measuring wait times of virtual machines in the pool of substantially identical virtual machines and based on the wait times increasing the number of virtual machines in the pool of substantially identical virtual machines. For example, if it takes too long to obtain a worker build machine 106 to perform compilation tasks, additional worker build machines 106 may be added to the pool 116.

The method 200 may further include executing automated tests on the compiled code. For example, embodiments may include additional testing suites that can be applied to worker build machines 106 that allows software builds to be tested after they have been compiled. This allows testing functionality to be offloaded to a public cloud system which can conserve bandwidth and other resources to prevent the need to send compiled code to a developer for testing.

The method 200 may further include deploying the compiled code to a user's end use location. For example, rather than providing the developer with the compiled code, the compiled code can be directly deployed to a website, web service, public cloud, or other computing system. This can preserve bandwidth as the compiled code would not need to be delivered to the developer over a network and then the developer deploy code, again over a network.

The method 200 may further include using the configured virtual machine to build code for one or more other users while building code for the user. Configuring the selected virtual machine in a way that is specific to the user may include configuring the virtual machine for multiple substantially simultaneous users. In some embodiments this may include isolating users on the same virtual machine to protect different users from accessing each other's data. In some embodiments, virtualization technology, such as the Drawbridge technology described above, may be used to isolate users on the same virtual machine.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing environment, a computer-implemented method of facilitating for one or more users of the distributed computing environment automated builds of executable code for one or more users' source code using shared resources of the distributed computing environment, the computer-implemented method comprising:

storing in a storage area of the distributed computing environment one or more project collections of source code for one or more users of a distributed computing environment, the one or more project collections for each user being stored separately from the one or more project collections of other users;

preparing a common build machine image that includes build tools comprising a controller for controlling an automated build of source code and a build agent for running the automated build of the source code;

replicating the common build machine image across a plurality of worker build machines which serve as a common pool of generically configured virtual machines providing shared resources for building executable code for one or more project collections of source code of the one or more users;

loading into a request queue requests for an automated build of executable code for one or more project collections of source code;

the plurality of worker build machines in said pool of shared resources monitoring the request queue to identify a next request in the request queue;

assigning the next request to a next available virtual machine;

in response to being assigned said next request, the next available virtual machine then performing the following:

configuring the controller and build agent of said assigned next available virtual machine to point to a stored project collection of source code corresponding to said assigned next request;

based on any custom configuration provided by the user for the project collection of source code corresponding to the assigned next request, configuring the assigned next available virtual machine with the custom configuration;

retrieving the project collection of source code for the assigned next request;

building an executable code version for the retrieved project collection of source according to the custom configuration; and storing the executable version and then removing the custom configuration to restore the assigned virtual machine to the generic configuration based on the common build machine image.

2. The computer-implemented method of claim 1, wherein said build tools of the common build machine image run on the virtual machines as a build service host running in a lower privilege state wherein write access is granted to a single directory where the build will take place.

3. The computer-implemented method of claim 2, wherein said virtual machines of said common pool each comprise an elastic build service that runs separately from said build service host to prevent an executable version of source code being built for a particular user from having access to other shared resources of the pool, and the elastic build service running as a local administrator that provides permission for cleaning up a corresponding virtual machine after completion of a build for an executable version of source code using a custom configuration of a user.

4. The computer-implemented method of claim 1, further comprising measuring idle times of the virtual machines in said common pool providing shared resources and based on the idle times reducing the number of virtual machines in the common pool.

5. The computer-implemented method of claim 1, further comprising measuring wait times of virtual machines in the common pool providing shared resources and based on the wait times increasing the number of virtual machines in the common pool.

6. The method of claim 1, further comprising executing automated tests on one or more executable versions of source code that are built.

7. The method of claim 1, further comprising deploying one or more executable versions of source code that are built to a user's end use location.

8. The computer-implemented method of claim 1, further comprising tracking with a globally scoped database results of hosted builds for all users.

9. The computer-implemented method of claim 8, further comprising tracking with said globally scoped database in-progress results of hosted builds for all users.

10. The computer-implemented method of claim 9, further comprising tracking with said globally scoped database statistical information about said virtual machines in said common pool and statistical information about said request queue.

11. The computer-implemented method of claim 1 further comprising preparing separate common build machine images and replicating the separate common build machine images in worker build machines for separate pools of virtual machines.

12. The computer-implemented method of claim 11, wherein the virtual machines of separate pools monitor separate request queues corresponding to the separate pools.

13. In a distributed computing environment, physical computer readable storage media storing computer executable instructions that when executed by one or more processors cause one or more processors to perform a computer-implemented method of facilitating for one or more users of the distributed computing environment automated builds of executable code for one or more users' source code using shared resources of the distributed computing environment, the computer-implemented method comprising:

storing in a storage area of the distributed computing environment one or more project collections of source code for one or more users of a distributed computing environment, the one or more project collections for each user being stored separately from the one or more project collections of other users;

preparing a common build machine image that includes build tools comprising a controller for controlling an automated build of source code and a build agent for running the automated build of the source code;

replicating the common build machine image across a plurality of worker build machines which serve as a common pool of generically configured virtual machines providing shared resources for building executable code for one or more project collections of source code of the one or more users;

loading into a request queue requests for an automated build of executable code for one or more project collections of source code;

the plurality of worker build machines in said pool of shared resources monitoring the request queue to identify a next request in the request queue;

assigning the next request to a next available virtual machine;

in response to being assigned said next request, the next available virtual machine then performing the following:

configuring the controller and build agent of said assigned next available virtual machine to point to a stored project collection of source code corresponding to said assigned next request;

based on any custom configuration provided by the user for the project collection of source code corresponding to the assigned next request, configuring the assigned next available virtual machine with the custom configuration;

retrieving the project collection of source code for the assigned next request;

building an executable code version for the retrieved project collection of source according to the custom configuration; and storing the executable version and then removing the custom configuration to restore the assigned virtual machine to the generic configuration based on the common build machine image.

14. The computer readable storage media of claim 13, wherein said build tools of the common build machine image run on the virtual machines as a build service host running in a lower privilege state wherein write access is granted to a single directory where the build will take place.

15. The computer readable storage media of claim 14, wherein said virtual machines of said common pool each comprise an elastic build service that runs separately from said build service host to prevent an executable version of source code being built for a particular user from having access to other shared resources of the pool, and the elastic build service running as a local administrator that provides permission for cleaning up a corresponding virtual machine after completion of a build for an executable version of source code using a custom configuration of a user.

16. The computer readable storage media of claim 13, further comprising measuring idle times of the virtual machines in said common pool providing shared resources and based on the idle times reducing the number of virtual machines in the common pool.

17. The computer readable storage media of claim 13, further comprising measuring wait times of virtual machines in the common pool providing shared resources and based on the wait times increasing the number of virtual machines in the common pool.

18. A system architecture for a distributed cloud computing environment configured to implemented a method of facilitating for one or more users of the distributed cloud computing environment automated builds of executable code for one or more users' source code using shared resources of the distributed computing environment, the system architecture comprising:

a storage area containing one or more project collections of source code for one or more users of the distributed cloud computing environment, the one or more project collections for each user being stored separately from the one or more project collections of other users of the distributed cloud computing environment;

a plurality of worker build machines which serve as a common pool of generically configured virtual machines providing shared resources for building executable code for one or more project collections of source code of the one or more users, each virtual machine having a common build machine image that includes build tools comprising a controller for controlling an automated build of source code and a build agent for running the automated build of the source code;

a messaging queue configured to receive requests to build executable code for one or more of said project collections of source code for said one or more users;

one or more processors; and physical storage media storing computer executable instructions that when executed by one or more processors cause one or more processors to perform a computer-implemented method of controlling the system architecture to facilitate for one or more users of the distributed computing environment automated builds of executable code for one or more users' source code using shared resources of the distributed computing environment, the computer-implemented method comprising:

loading into the messaging queue requests for an automated build of executable code for one or more project collections of source code;

the plurality of worker build machines in said pool of shared resources monitoring the messaging queue to identify a next request in the messaging queue;

assigning the next request to a next available virtual machine;

in response to being assigned said next request, the next available virtual machine then performing the following:

configuring the controller and build agent of said assigned next available virtual machine to point to a stored project collection of source code corresponding to said assigned next request;

based on any custom configuration provided by the user for the project collection of source code corresponding to the assigned next request, configuring the assigned next available virtual machine with the custom configuration;

retrieving the project collection of source code for the assigned next request;

building an executable code version for the retrieved project collection of source according to the custom configuration; and storing the executable version and then removing the custom configuration to restore the assigned virtual machine to the generic configuration based on the common build machine image.

19. The system architecture of claim 18, wherein said build tools of the common build machine image run on the virtual machines as a build service host running in a lower privilege state wherein write access is granted to a single directory where the build will take place.

20. The system architecture of claim 19, wherein said virtual machines of said pool each comprise an elastic build service that runs separately from said build service host to prevent an executable version of source code being built for a particular user from having access to other shared resources of the pool, and the elastic build service running as a local administrator that provides permission for cleaning up a corresponding virtual machine after completion of a build for an executable version of source code using a custom configuration of a user.

* * * * *